United States Patent
Durance et al.

(10) Patent No.: US 6,312,745 B1
(45) Date of Patent: Nov. 6, 2001

(54) PROCESS FOR DEHYDRATION OF BERRIES

(75) Inventors: Timothy D. Durance; Ziba Vaghri; Christine H. Scaman, all of Vancouver; David D. Kitts, Richmond; Jian Hua Wang, Burnaby; Chun Hu, Vancouver, all of (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/612,442

(22) Filed: Jul. 7, 2000

(51) Int. Cl.[7] .................. A23B 7/00; H05B 6/00
(52) U.S. Cl. .......... 426/242; 426/465; 426/489; 219/686; 34/15
(58) Field of Search ................. 426/242, 465, 426/489; 219/686; 34/15

(56) References Cited

U.S. PATENT DOCUMENTS

| | | |
|---|---|---|
| 4,341,803 | 7/1982 | Koshida et al. . |
| 4,418,083 * | 11/1983 | McKinney et al. ........ 426/242 |
| 4,515,822 | 5/1985 | Kraig et al. . |
| 5,000,972 | 3/1991 | Nafisi-Novaghar . |
| 5,020,237 * | 6/1991 | Gross et al. .................. 34/1 |
| 5,135,122 * | 8/1992 | Gross et al. ............. 219/10.55 |
| 5,962,057 | 10/1999 | Durance et al. . |
| 6,004,590 * | 12/1999 | Subramaniam et al. ....... 426/50 |
| 6,086,933 * | 7/2000 | Rockstrom ................. 426/243 |

OTHER PUBLICATIONS

Dehydrated Blueberries by Continuous Explosion—Puffing Process: Sullivan et al Journal of Food Science vol. 47 (1982).

* cited by examiner

Primary Examiner—Nina Bhat
(74) Attorney, Agent, or Firm—C. A. Rowley

(57) ABSTRACT

A process for drying antioxidant-rich berries (such as blueberries) to preserve their antioxidant action and their antioxidant compounds is disclosed. The process may conventionally dry the antioxidant-rich berries to remove 0 to 90% of the initial mass of water associated with them, but the important step is subjecting the antioxidant-rich berries to vacuum microwave drying (VMD) at an absolute pressure of 0 to 200 millimeters of mercury (mm Hg) (preferably 30 to 60 mm Hg) and 0.1 to 2 watts of microwave power/gram of berries (preferably 0.5 to 1 watt/gram) to reduce the moisture content to a residual moisture content of less than 35% of the dry weight of the final dry product

20 Claims, 1 Drawing Sheet

PROCESS FOR DEHYDRATION OF BERRIES

FIELD OF THE INVENTION

The present invention relates to the drying of antioxidant-rich berries while preserving antioxidant characteristics of the berries.

BACKGROUND OF THE INVENTION

Many berries, including blueberries, strawberries, cranberries, raspberries, black currants and others, contain naturally occurring chemical constituents with antioxidant activity and may therefore be termed "antioxidant-rich berries". Antioxidants are chemicals that can inhibit oxidation reactions. Oxidation reactions are known to produce harmful chemicals within living animals, including humans. Chemically, oxidation is an event in which a compound loses electrons. In biological systems, unsaturated lipids are important constituents that are highly susceptible to oxidation reactions, especially autoxidation reactions, that is oxidation reactions with molecular oxygen.

Autoxidation reactions of complex compounds typically occur in a series or chain-reaction, which can be divided into three stages described as initiation, propagation and termination stages (Pokorny, J. 1999. Antioxidants in Food Preservation. p. 309–337, IN "*Handbook of Food Preservation*" M. S. Rahman, ed. Marcel Dekker Inc., N.Y.). Initiation requires a free radical, that is a compound with an unpaired electron. Free radicals may arise from a number of physiological or degradative reactions within biological tissues and materials. Free radicals are very reactive and quickly react with unsaturated lipids, oxygen and other compounds to form degradation products, some of which are themselves free radicals. This is called the propagation stage of autoxidation. Eventually the chain reaction may terminate when all oxidizable materials or free radicals are consumed.

Pro-oxidants are compounds that tend to initiate and promote the oxidation sequence and include metals such as iron and copper. Antioxidants are substances that can delay the onset or slow the rate of oxidation of autoxidizable materials (Nawar, W. 1985 Lipids, p. 225–320. IN "*Food Chemistry*" O. R. Fennema, ed. Marcel Dekker Inc. N.Y.). Antioxidants can function by a number of mechanisms such as chelating metals to inhibit their pro-oxidant activity or by combining with and "quenching" free radicals. Other compounds with antioxidant activity such as ascorbic acid, act as synergists with other antioxidants, often re-activating spent antioxidants by reducing them back into an active form. Free radicals are also generated as byproducts of many physiological reactions within living organisms and for this reason, a balance must be maintained in the human body between pro-oxidants and antioxidants.

Due to the toxicity of many autoxidation products, antioxidants are considered desirable in the human diet. Many health benefits have been associated with antioxidants in foods, including anti-mutagenicity, anti-carcinogenicity and anti-aging (Cook and Samman, 1996. Flavonoids chemistry, metabolism, cardioprotective effects and dietary sources. Nutritional Biochemistry 7:66–76; Huang and Frankel, 1997. Antioxidant activity of tea catechins in different lipid systems. J. Agricultural and Food Chemistry. 45: 3033–3038). Although synthetic chemical antioxidants are known, natural antioxidants in familiar foods are in great demand due to their long historical record in the human diet and presumed safety. Natural antioxidants which have be identified in common foods include phenolic compounds such as tocopherols and flavonids, including anthocyanins, as well as carotenoids, amino acids, and ascorbic acid (Pokorny, J. 1999. ).

Blueberries (a prime example of antioxidant-rich berries) are the fruit of plants belonging to the genus Vaccinium, including *V. corymbosum, V. ashei* and *V. augustifolium* and grow throughout North America. They have been used as food since prehistoric times and today are an important food crop. Commercially marketed blueberries include both wild, low-bush blueberries (e.g. *V. augustifolium*) which grow primarily in Maine, Nova Scotia and Quebec, and cultivated, high-bush blueberries (e.g. *V. corymbosum* and *V. ashei*), grown principally in British Columbia, Michigan and New Jersey.

Blueberries have a brief harvest season of about one month, after which fresh blueberries can only be stored refrigerated for a maximum of 6 weeks. Therefore further processing is desirable to extend shelf-life. Although large amounts of blueberries are frozen for preservation, frozen storage-life is only about 6 months, after which the fruit develop texture problems such as woodiness and grittiness (Sullivan et al., 1982. Dehydrated blueberries by the continuous explosion-puffing method. Journal of Food Science 47: 445–448). Dehydration is another popular preservation method for blueberries. If the water activity of the fruit is reduced by dehydration to below 0.60, spoilage microorganisms are unable to grow and a storage life greater than 6 months can be achieved. Furthermore, dehydrated blueberries do not require energy-intensive refrigerated storage and are lighter and less fragile during transportation.

Most commercial dehydration of blueberries is accomplished by hot air forced-convection drying in which heated dry air is passed over or through a bed of the fruit. A small portion of the blueberry crop each year may be freeze-dried, a process by which the water is sublimated directly from the frozen state under conditions of very low absolute pressure. Although freeze dried fruit are considered very good quality from the point of view of nutrition and flavor, the process is used to a limited extent because of its high cost.

Some of the health benefits provided by fruits and vegetables in the human diet have been attributed to antioxidant activity. In antioxidant-rich berries such as blueberries, two major contributors to antioxidant activity are ascorbic acid, also known as vitamin C, and a complex group of phenolic compounds. Much of the antioxidant activity of the phenolics is attributed to a sub-group known as anthocyanins. Anthocyanins are the primary pigments of berries and are responsible for the color of berries. In fact, various anthocyanins are responsible for almost all of the red, purple and blue colors of fruits and flowers. They are known to have strong antioxidant activity (Wang et al., 1996. Total antioxidant capacity of fruits. Journal of Agricultural and Food Chemistry 44: 701–705). Of all berries, blueberries have the highest concentration of anthocyanins, followed by cranberries and strawberries.

Drying of fruits is described in the patent literature and attention is directed to Kraig et al. U.S. Pat. No. 4,515,822 which teaches a method of coating fruit pieces with sugars and gums, then drying rapidly in air above 220° F. to puff and dry the fruit pieces. Koshida et al. U.S. Pat. No. 4,341,803 teaches a method of producing a crisp dry fruit snack by a sequential combination of freeze drying, microwave drying and vacuum drying. Nafisi-Movaghar U.S. Pat. No. 5,000,972 teaches a method of drying fruit without sulfiting. Mazin et al. U.S. Pat. No. 5,188,861 teaches a method of removing natural flavor from dry fruit pieces and introducing a new, substantially different flavor and Durance et al. U.S. Pat. No. 5,962,057 teaches a method of drying mango and pineapple with fresh flavor and crunchy texture. None of these patents deal with the specific problem of drying antioxidant-rich berries while minimizing the loss of antioxidant properties of the dried berries.

Blueberries have recently been the subject of scientific study as potent antioxidants in the human diet (Costantino, L. et al. 1996. Anthocyanin inhibitors of xanthine oxidase. *Pharmazie* (50):573–574

Antioxidants can be measured by various methods. Known antioxidant compounds may be quantified by standard analytical methods. For example, total phenolics can be measured by the Folin-Ciolacalteu method, using gallic acid as a standard (Velioglu et al. 1998. Journal of Agriculture and Food Chemistry (46): 4113–4117). Anthocyanins may be measured a spectrophotometric methods (Fuleki, T. and Francis, F. J. 1968. J. of Food Science (33):73–83.) Antioxidant activity can also be measured directly be initiating a standard oxidation reaction in vitro, such as the reaction measured by the thiobarbituric acid reaction assay (TBAR) (Buerge and Aust, 1978. Methods in Enzymology (52):302–310), then measuring the inhibition of oxidation conferred by the test sample. Antioxidant activity in a different system can be measured by the DPPH free radical scavenging method (Hu and Kitts. 2000. Antioxidant activity of Echinacea root extracts. Journal of Agricultural and food Chemistry 48: 1466–1472.) DPPH is a stable free radical (2,2-diphenyl-1-picrylhydrazyl) that is scavenged directly by the antioxidant substrate. This method therefore measures inhibition properties at both the initiation and propagation stages of the oxidation reaction.

BRIEF DESCRIPTION OF THE INVENTION

It is the object of the present invention to provide a process by which antioxidant-rich berries can be dried while retaining a significant portion of the antioxidant activity of the fresh berries and a significant absolute amount of known antioxidant compounds such as ascorbic acid, phenolic compounds and anthocyanins.

It is an object of the invention to provide a vacuum microwave process for dehydration of antioxidant-rich berries while preserving the antioxidant properties of the berries (i.e. without destroying the antioxidant properties to the extent they are destroyed using conventionally used dying procedures).

Broadly the present invention relates to a process for drying antioxidant-rich berries containing an initial mass of water to preserve their antioxidant action and their antioxidant compounds comprising subjecting the berries to vacuum microwave drying (VMD) at an absolute pressure of 0 to 200 millimeters of mercury (mm Hg) and 0.1 to 2 watts of microwave power/gram of said antioxidant-rich berries containing said initial mass of water to produce dried berries wherein the moisture content of said berries containing an initial mass of water is reduced to a residual moisture content of less than 35% of the dry weight of said dried berries.

Preferably said VMD is applied to reduce the moisture content to a residual moisture content of between 10% and 25% of the dry weight of the final product of the process.

Preferably said absolute pressure is between 30 and 60 mm Hg.

Preferably said microwave power is applied at 0,5 to 1 watt/gram of antioxidant-rich berries.

Preferably said antioxidant-rich berries are subjected to preliminary drying step wherein said berries are partially dried to remove up to 90% of the initial mass of water associated with the berries then Preferably said preliminary drying removes less than 70% of said initial mass of water.

Preferably said berries are agitated during said VMD.

Preferably said VMD comprise a cooling step following application of microwave power wherein said antioxidant-rich berries are subject to a vacuum without application of microwave power

BRIEF DESCRIPTION OF THE DRAWINGS

Further features, objects and advantages will be evident from the following detailed description of the invention taken in conjunction with the accompanying drawings in which.

DESCRIPTION OF THE PREFERRED EMBODIMENTS

Figure 1:
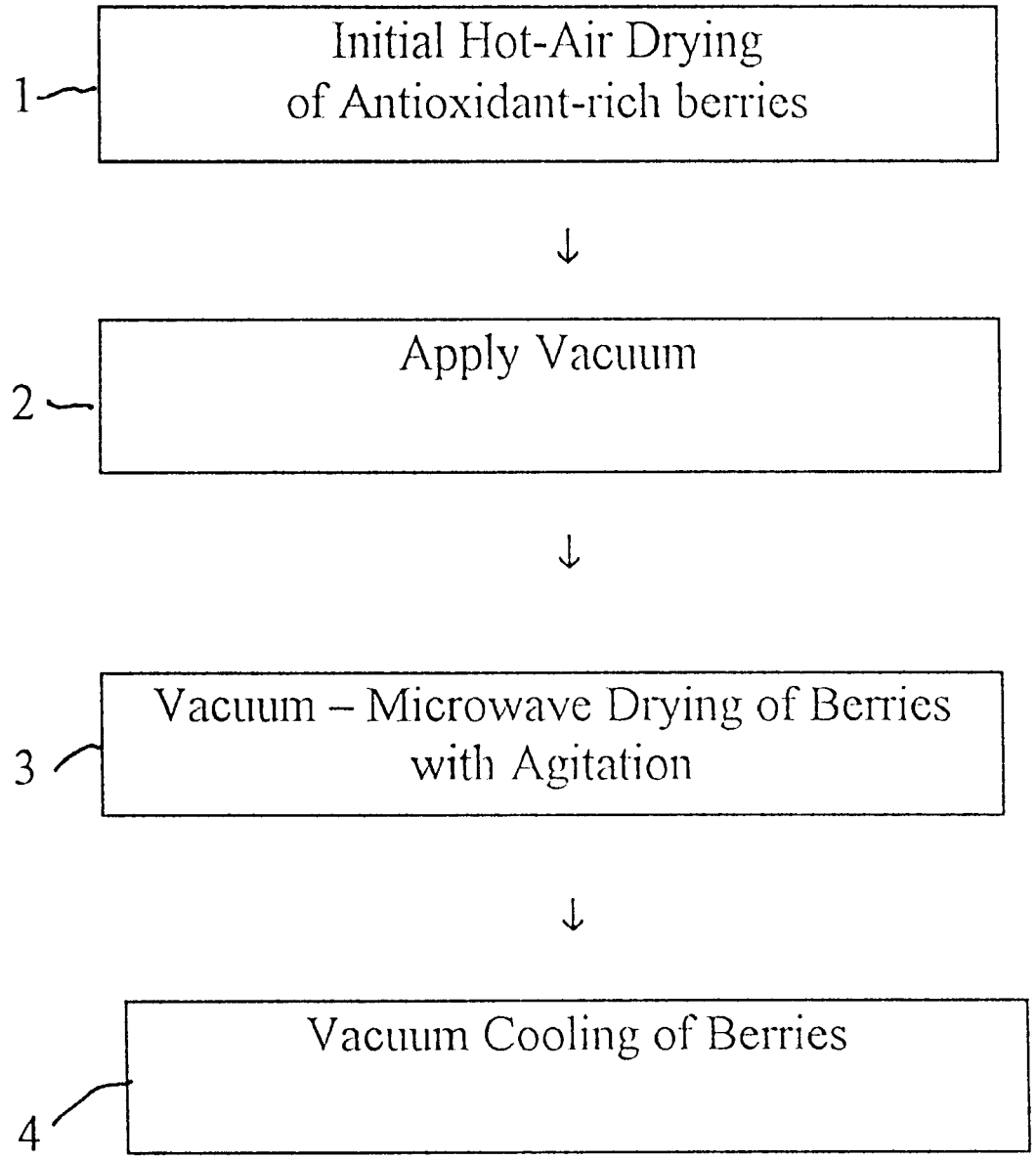
FIG. 1 is a schematic flow diagram illustrating the steps in the process.

As shown in FIG. 1, the preferred process involves if desired, first partially dehydrating the antioxidant-rich berries by conventional means as indicated in 1., such as placing them in a moving air stream at 60° C. to 90° C. for 1 to 4 hours to remove about one half of the initial weight of the incoming berries in the form of evaporated water. This step removes a portion of the water which is less strongly bound to the berry solids and which is consequently readily and quickly removed by the hot air treatment. This step uses conventional air drying equipment. Any amount of the original water from zero to about 90% of the initial water in the berries may in theory be removed by air drying prior to vacuum microwave drying (VMD). In some cases it may be desirable to begin vacuum microwave drying from the fresh or frozen state without first air drying, such as in the situation when it was desirable to dry the antioxidant-rich berries very quickly or to retain the maximum possible content of antioxidant activity.

The antioxidant-rich berries are subjected to VMD by placing them in the vacuum chamber as indicated in 2. and the chamber air pressure is reduced to 30 to 60 mm of mercury absolute pressure in the preferred process but to at least as low as 200 mm of mercury. During or immediately following the application of vacuum, microwave power is applied in the amount of 0.1 watt to 2.0 watts microwave power per gram of initial fresh weight of berries (with the initial water content) as indicated in 3. In the preferred process microwave power in the amount of 0.5 watts per gram to 1.0 watts per gram of fresh berries is applied in step 3.

The vacuum cooling step 4. is optional depending on whether a puffed, expanded dry antioxidant-rich berry product is desired. Due to the rapid evaporation of water during the vacuum microwave dehydration step, the berries will expand or puff inside the chamber. Vacuum cooling allows the berries to grow more rigid before atmospheric air pressure is allowed to enter the chamber, thus allowing the berries to remain puffed.

Table 1 summarizes the various steps in the process, the sequence in which they will occur (if applied) and the conditions or duration of each of the steps.

TABLE 1

VMD Process for antioxidant-rich berries

| Process step/parameter | Preferred range | Acceptable range |
|---|---|---|
| 1. Initial air drying | To remove 0% to 70% of initial mass of water in blueberries. | To remove 0% to 90% of initial mass of water in blueberries |
| 2. VMD chamber pressure (Absolute) | 30 to 60 mm of Hg | 0 to 200 mm Hg |
| 3. Microwave power density | 0.5 to 1.0 Watts per gram fresh berries | 0.1 to 2 watts per gram fresh berries |
| 4. Agitation during periods of microwave power. | Equivalent to agitation in a 12 inch cylindrical drum rolling on its axis at 2 to 4 RPM. | Equivalent to agitation in a 12 inch cylindrical drum rolling on its axis at 1 to 10 RPM. |
| 5. Cooling stage at end of VMD step. | 2 to 5 minutes under vacuum without microwave power. | 0 to 10 minutes under vacuum without microwave power. |
| 6. Final air drying | None. | To remove the last 0 to 6% of total initial mass of moisture. |
| 7. Final moisture of antioxidant-rich berries | 10 to 20% wet weight basis* (1.5% to 3% of the total initial mass of moisture) | 3 to 30% wet weight basis* (0.5% to 5% of the total initial of moisture) |

*"wet weight basis" means the weight of moisture divided by the weight of berries including the remaining moisture.

Vacuum microwave dehydration of antioxidant-rich berries leads to a dry product with excellent berry flavor retention and an expanded, puffed, tender texture as taught in Durance et al (U.S. Pat. No. 5,962,057). Unexpected benefits of vacuum microwave dehydration of antioxidant-rich berries were improved preservation of chemical compounds related to antioxidant activity of this fruit.

EXAMPLES

Table 2 presents a number of experimental results of chemical analysis related to antioxidant activity. Two different types of blueberries were dried. In the case of one type (Blue Crop) two batches of blueberries from different farms and storage times were dried by each method and analyzed separately. Each number in Table 2 represents the average of at least triplicate determinations. Each batch of blueberries was purchased frozen, divided into portions and individual portions were either air dried, freeze dried, vacuum microwave dried or dried by a combination process in which half the initial weight was removed by air drying, after which drying was completed by vacuum microwave. In each case, antioxidant-rich berries were dried sufficiently to preserve the fruit without refrigeration, that is to a water activity of less 0.60. Water activity, a thermodynamic property, is defined as the ratio of the vapor pressure of water in a system to the vapor pressure of pure water at the same temperature.

Table 2 presents a comparison of composition related to antioxidant activity of blueberries dried by a variety of methods. Air temperature for the air drying (AD) treatment and the air portion of the ADNVMD treatment was at 70° C. for Blueberry 1 & 2 and 84° C. for Blueberry 3. Freeze drying was accomplished at 0.1 mm Hg absolute pressure, a condenser temperature of −50° C. and a shelf temperature of 20° C. The AD/VMD process was Example 3 for Blueberry 1 & 2 and Example 1 for Blueberry 3. The VMD process was as described in Example 2. Blueberries 2 and 3 were from the same type of blueberry plant but from different farms and stored different periods prior to the experiments

TABLE 2

| Antioxidant concentration or activity | Drying Method Antioxidant -rich berry type | Air Dried (AD) @ 70° C. | Combination AD/VMD | VMD | Freeze Dried | Frozen undried (starting material) |
|---|---|---|---|---|---|---|
| Phenolics (mg gallic acid equivalents/100 g dry) | 1. Hardy Blue | 2150 | 2230 | 3350 | 2450 | 3550 |
| Phenolics(mg gallic acid equivalents/100 g dry) | 2. Bluecrop | 1490 | 1520 | 2050 | 1780 | 2450 |
| phenohcs (mg gallic acid equivalents/100 g dry) | 3. Bluecrop | 1023 | 1302 | 1528 | 1222 | 2855 |
| anthocyanins by spectrophotometry (mg/100 g dry) | 1. Hardy Blue | 198 | 218 | 498 | 524 | 530 |
| anthocyanins by spectrophotometery (mg/100 g dry) | 2. Bluecrop | 117 | 129 | 173 | 319 | 258 |
| anthocyanins by liquid chromatography (mg/100 g dry) | 3. Bluecrop | 290 | 520 | 740 | 660 | Not Determined |
| ascorbic acid (mg/100 g dry) | 1. Hardy Blue | none detected | none detected | 8 | 22 | 37 |
| ascorbic acid (mg/100 g dry) | 2. Bluecrop | none detected | none detected | 9 | 25 | 23 |
| ascorbic acid (mg/100 g dry) | 3. Bluecrop | 9.4 | 3 | 10 | 12 | 21 |
| antioxidant activity (% inhibition by TBAR method) | 1. Hardy Blue | 20 | 25 | 28 | 30 | 46 |
| antioxidant activity (TBARS) | 2. Bluecrop | 19 | 20 | 23 | 23 | 32 |
| antioxidant activity (% inhibition by free radical scavenging method) | 3. Bluecrop | 32 | 39 | 64 | 52 | Not determined |

Phenolics of berries, as a class of chemical compounds, have been identified as important antioxidants. Phenolic content of the berries was measured by the method of Velioglu et al. (1998). In experiments with two types of blueberries, VMD berries had higher concentrations of total phenolics than the same berries when dried by other methods and closest to the concentration found in the un-dried, frozen berries. The combination AD/VMD process yielded an intermediate concentration of phenolics. Freeze dehydration, often reported to be the most effective means of dehydration for preservation of chemical integrity, retained less phenolics than VMD.

Anthocyanins are a sub-class of phenolics which have been identified as important to antioxidant activity of antioxidant-rich berries. Anthocyanin content of VMD berries was consistently higher than that of any drying treatment except freeze drying. Depending upon the experimental conditions and assay method, anthocyanin content of VMD blueberries were either slightly higher or lower than in freeze dried blueberries. The combination AD/VMD process yielded anthocyanin content intermediate between VMD and AD.

Ascorbic acid, also known as vitamin C is an important synergist of antioxidants.

Ascorbic acid may be degraded in drying fruit by the activity of the native enzyme ascorbic acid oxidase or by chemical oxidation. The ascorbic acid oxidase enzyme is active at the temperature of berries during AD but is not active in the dry fruit. Therefore extended times in the air dryer may be destructive to this antioxidant. Again, VMD retained more vitamin C than other drying treatments except freeze drying.

Antioxidant activity of processed antioxidant-rich berries were assessed using different oxidation reactions to evaluate activity related to multiple mechanisms of action, the pattern of antioxidant activity associated with specific drying methods was consistent. Thus, according to both methods of analysis, the un-dried starting material had the highest antioxidant activity and the air-dried antioxidant-rich berries had the lowest. VMD and freeze drying (FD) provided the greatest retention of antioxidant activity of dried treatments and these two treatments had similar activities. The combination AD/VMD treatment yield antioxidant activity intermediate between that of all-air dried and all VMD dried berries.

Thus VMD treatments were seen to retain more antioxidant compounds and more antioxidant activity than air drying, and similar concentrations and activities as freeze drying treatments. Combination AD/VMD processed antioxidant-rich berries yielded intermediate results. Thus VMD can provide an alternative to freeze drying of berries to maintain maximum antioxidants in the dry product.

Obviously the VMD or AD/VMD processes of this invention could also be applied to fresh or frozen antioxidant rich berries that had been pretreated for example by having been previously infused with sugars by immersion in a solution of sugars.

Example 1

Frozen blueberries (2 kg, 86.4% moisture wet basis) were air dried for 1.5 hours in a commercial air dryer at 84° C. to remove 965 grams of water. Next 600 grams of the partially dried blueberries were placed in the cylindrical drying basket of a 1.5 kW, 2450 MHz vacuum microwave. Vacuum was applied to an absolute chamber pressure of 40 mm Hg over a 1.5 minute period. Next, 1.5 kW of microwave power was applied for 16 minutes, while the drying basket was rotated on its axis at 3 rpm to agitate the berries and ensure even exposure to microwaves. Finally the berries were allowed to cool under the same vacuum and rpm but zero microwave power for 3 minutes. The final moisture content of the berries was 18% dry basis and the final water activity was 0.50.

Example 2

Frozen blueberries (1.5 kg, 86.4% moisture wet basis) were placed in the cylindrical drying basket of a 1.5 kW, 2450 MHz vacuum microwave. Vacuum was applied to an absolute chamber pressure of 40 mm Hg over a 1.5 minute pump-down period. Next, 1.5 kW of microwave power was applied for 38 minutes, while the drying basket was rotated on its axis at 3 rpm to agitate the berries and ensure even exposure to microwaves and vacuum was maintained. Next the microwave power was reduced to 0.75 kW for 5.5 minutes. Finally the berries were allowed to cool under the same vacuum and rpm but zero microwave power for 3 minutes. The final moisture content of the berries was 15% dry basis and the final water activity was 0.48.

Example 3

A total of 10.9 kg of frozen blueberries were dried on a commercial belt air dryer with an air temperature of 70° C. for 4 hours, to remove 6.66 kg grams of water. Next 2.24 kg of the partially dried blueberries were placed in the cylindrical drying basket of a 1.5 kW, 2450 MHz vacuum microwave. Vacuum was applied to an absolute chamber pressure of 40 mm Hg over a 1.5 minute period. Next, 1.5 kW of microwave power was applied for 48 minutes, while the drying basket was rotated on its axis at 3 rpm to agitate the berries and ensure even exposure to microwaves. Finally the berries were allowed to cool under the same vacuum and rpm but zero microwave power for 3 minutes. The final moisture content of the berries was 18% dry basis and the final water activity was 0.49.

Having described the invention modifications will be evident to those skilled in the art without departing from the spirit of the invention as defined in the appended claims

What is claimed is:

1. A process for drying antioxidant-rich berries containing an initial mass of water to preserve their antioxidant action and their antioxidant compounds comprising preliminary drying the antioxidant-rich berries to remove 0 to 90% of the initial mass of water associated with the antioxidant-rich berries, subjecting antioxidant-rich berries to vacuum microwave drying (VMD) at an absolute pressure of 0 to 200 millimeters of mercury (mm Hg) and 0.1 to 2 watts of microwave power/gram of said antioxidant-rich berries containing said initial mass of water to produce dried antioxidant-rich berries containing said initial mass of water to produce rich berries containing an initial mass of water is reduced to a residual moisture content of less than 35% of the dry weight of said dried antioxidant-rich berries.

2. A process for drying antioxidant-rich berries as defined in claim 1 wherein said residual moisture content is between 10% and 25% of the dry weight of said dried antioxidant-rich berries.

3. A process for drying antioxidant-rich berries as defined in claim 2 wherein said absolute pressure is between 30 and 60 mm Hg.

4. A process for drying antioxidant-rich berries as defined in claim 3 wherein said microwave power is applied at 0.5 to 1 watt/gram of antioxidant-rich berries.

5. A process for drying antioxidant-rich berries as defined in claim 3 wherein said VMD includes a cooling step following application of microwave power wherein said dried antioxidant-rich berries are subject to vacuum without application of microwave power.

6. A process for drying antioxidant-rich berries as defined in claim 4 wherein said VMD includes a cooling step following application of microwave power wherein said dried antioxidant-rich berries are subject to vacuum without application of microwave power.

7. A process for drying antioxidant-rich berries as defined in claim 2 wherein said microwave power is applied at 0.5 to 1 watt/gram of antioxidant-rich berries.

8. A process for drying antioxidant-rich berries as defined in claim 1 wherein said absolute pressure is between 30 and 60 mm Hg.

9. A process for drying antioxidant-rich berries as defined in claim 8 wherein said microwave power is applied at 0.5 to 1 watt/gram of antioxidant-rich berries.

10. A process for drying antioxidant-rich berries as defined in claim 1 wherein said microwave power is applied at 0.5 to 1 watt/gram of antioxidant-rich berries.

11. A process for drying antioxidant-rich berries as defined in claim 1 wherein said preliminary drying removes less than 70% of said initial mass of water.

12. A process for drying antioxidant-rich berries as defined in claim 11 wherein said VMD includes a cooling step following application of microwave power wherein said dried antioxidant-rich berries are subject to vacuum without application of microwave power.

13. A process for drying antioxidant-rich berries as defined in claim 11 wherein said residual moisture content is between 10% and 25% of the dry weight of said dried antioxdant-rich berries.

14. A process for drying antioxidant-rich berries as defined in claim 11 wherein said absolute pressure is between 30 and 60 mmHg.

15. A process for drying antioxidant-rich berries as defined in claim 13 wherein said absolute pressure is between 30 and 60 mm Hg.

16. A process for drying antioxidant-rich berries as defined in claim 13 wherein said microwave power is applied at 0.5 to 1 watt/gram of antioxidant-rich berries.

17. A process for drying antioxidant-rich berries as defined in claim 14 wherein said microwave power is applied at 0.5 to 1 watt/gram of antioxidant-rich berries.

18. A process for drying antioxidant-rich berries as defined in claim 15 wherein said microwave power is applied at 0.5 to 1 watt/gram of antioxidant-rich berries.

19. A process for drying antioxidant-rich berries as defined in claim 1 wherein said VMD includes a cooling step following application of microwave power wherein said dried antioxidant-rich berries are subject to a vacuum without application of microwave power.

20. A process for drying antioxidant-rich berries as defined in claim 1 inclusive wherein said antioxidant-rich berries are blueberries.

* * * * *

UNITED STATES PATENT AND TRADEMARK OFFICE
CERTIFICATE OF CORRECTION

| | |
|---|---|
| PATENT NO. | : 6,312,745 B1 |
| APPLICATION NO. | : 09/612442 |
| DATED | : November 6, 2001 |
| INVENTOR(S) | : Timothy D. Durance et al. |

It is certified that error appears in the above-identified patent and that said Letters Patent is hereby corrected as shown below:

In the Claims:

In claim 1, column 8, lines 54-55, delete "containing said initial mass of water to produce rich berries" and replace it with --wherein the moisture content of said antioxidant-rich berries--.

Signed and Sealed this
Fourteenth Day of May, 2013

Teresa Stanek Rea
*Acting Director of the United States Patent and Trademark Office*